United States Patent [19]
Loock

[11] Patent Number: 5,078,570
[45] Date of Patent: Jan. 7, 1992

[54] TRANSPORT SYSTEM FOR MACHINING OPERATION

[75] Inventor: Manfred Loock, Sprockhövel, Fed. Rep. of Germany

[73] Assignee: Ernst Thielenhaus KG, Wuppertal, Fed. Rep. of Germany

[21] Appl. No.: 503,616

[22] Filed: Apr. 2, 1990

[30] Foreign Application Priority Data

Apr. 6, 1989 [DE] Fed. Rep. of Germany ....... 3911111
Jan. 27, 1990 [DE] Fed. Rep. of Germany ....... 4002405

[51] Int. Cl.$^5$ .............................................. B65G 25/02
[52] U.S. Cl. .................................. 414/751; 74/141.5; 198/621; 414/225
[58] Field of Search ............... 414/749, 750, 751, 225; 74/141.5; 198/621

[56] References Cited

U.S. PATENT DOCUMENTS 4,604,021 8/1986 Werner ........................... 414/751 X
4,735,303 4/1988 Wallis ............................. 414/751 X
4,875,931 10/1989 Monteiro ....................... 198/621 X Primary Examiner—Robert J. Spar
Assistant Examiner—Donald W. Underwood
Attorney, Agent, or Firm—Herbert Dubno; Andrew Wilford

[57] ABSTRACT

A machining operation where a workpiece is moved stepwise in a transport direction through a succession of stations has a transport apparatus comprising a stationary housing adjacent the stations, a rail extending in the direction adjacent the stations and movable both parallel and perpendicular to the direction, and a plurality of clamps spaced apart in the direction on the rail and each displaceable between an open and a closed position, whereby a workpiece can be gripped by each of the clamps in the closed position thereof. A set of control rods carried and displaceable on the rail is oppositely displaceable to move the clamps between their open and closed positions. A pair of like lever systems each having an inner end pivoted on the housing and an outer end pivoted on the rail can be synchronously pivoted to displace the rail through a predetermined stroke perpendicular to the direction between inner and outer positions. A transverse guide and entrainment element carried at least partially on the rail can displace the rail through a predetermined stroke parallel to the direction between upstream and downstream end positions. A set of endless flexible drive elements, either toothed belts or chains, extends along one of the lever systems and has an outer end connected to a pinion meshing with the jaw-control rods for displacing the clamps between their open and closed positions.

5 Claims, 5 Drawing Sheets

5,078,570

TRANSPORT SYSTEM FOR MACHINING OPERATION

FIELD OF THE INVENTION

The present invention relates to a transport system for a machining operation. More particularly this invention concerns a device for stepping a workpiece through successive stations of a mass-production machining operation.

BACKGROUND OF THE INVENTION

A standard mass-production machining operation has a plurality of stations spaced apart in a transport direction along a treatment path. There is invariably an input station at the upstream end of the path, an output station at the downstream end of the path, and one or more treatment stations along the path between the input and output stations. Various machine tools, for instance grinding apparatuses, drills, and the like are provided at the treatment stations for working on the workpieces at the stations. Normally these stations are all spaced equidistantly apart along the path and the transport device operates in steps equal to the distance between adjacent stations. Each treatment machine at a treatment station is typically provided with means for gripping and, if necessary, positioning the workpiece as it is treated at the respective station.

In a standard known system the path is an arc, typically of at least part-circular shape, so that the transport device can operate in fact like a turntable or carrousel. The turntable has seats spaced apart by the length of the transport step and set up so as each to hold the respective workpiece as the workpieces are stepped to the downstream stations.

Such an arrangement is a fairly complicated. When there are a great many treatment stations the transport device becomes quite complex. In addition the overall floor space taken up by such a transport device can become extremely large.

OBJECTS OF THE INVENTION

It is therefore an object of the present invention to provide an improved transport system for stepping workpieces through a machining apparatus.

Another object is the provision of such an improved transport system for stepping workpieces through a machining apparatus which overcomes the above-given disadvantages, that is which can step the workpieces in a straight line, and that is of simple construction.

SUMMARY OF THE INVENTION

A machining operation where a workpiece is moved stepwise in a transport direction through a succession of stations has a transport apparatus comprising a stationary housing adjacent the stations, a rail extending in the direction adjacent the stations and movable both parallel and perpendicular to the direction, and a plurality of clamps spaced apart in the direction on the rail and each displaceable between an open and a closed position, whereby a workpiece can be gripped by each of the clamps in the closed position thereof. Two control rods carried and displaceable on the rail are oppositely displaceable to move the clamps between their open and closed positions. A pair of like lever systems each having an inner end pivoted on the housing and an outer end pivoted on the rail can be synchronously pivoted to displace the rail through a predetermined stroke perpendicular to the direction between inner and outer positions. A transverse guide and entrainment element carried at least partially on the rail can displace the rail through a predetermined stroke parallel to the direction between upstream and downstream end positions. A set of endless flexible drive elements, either toothed belts or chains, extends along one of the lever systems and has an outer end connected to a pinion meshing with the jaw-control rods for displacing the clamps between their open and closed positions.

According to a further feature of this invention each lever system includes an inner lever having an inner end pivoted on the housing and an outer end, and an outer link having an inner end pivoted on the outer end of the respective inner lever and an outer end pivoted on the rail. The longitudinal displacement means includes an arm pivoted on the housing with one of the inner levers and having a head transversely but not longitudinally displaceable in the guide of the rail.

Furthermore according to the invention an inner abutment can engage the rail only in the inner position thereof and an outer abutment engages the rail only in the outer position thereof so that the inner and outer legs of the four-sided path a point on the rail defines in one transport cycle has straight sides. To this end the lever systems are each provided with a spring or the like connecting it to the actuator that operates it so as to permit limited pivoting of the lever systems during straight-line movement between the upstream and downstream end positions.

Finally in accordance with this invention the clamp closer includes a shaft coaxial with the inner end of the one lever systems, a pinion carried on the shaft and connected to the inner end of the set of elements, and means connecting the pinion to the shaft in any of a plurality of angularly offset position for setting the spread between the jaws in the open and closed positions.

DESCRIPTION OF THE DRAWING

The above and other objects, features, and advantages will become more readily apparent from the following, reference being made to the accompanying drawing in which.

SPECIFIC DESCRIPTION

Figure 1:
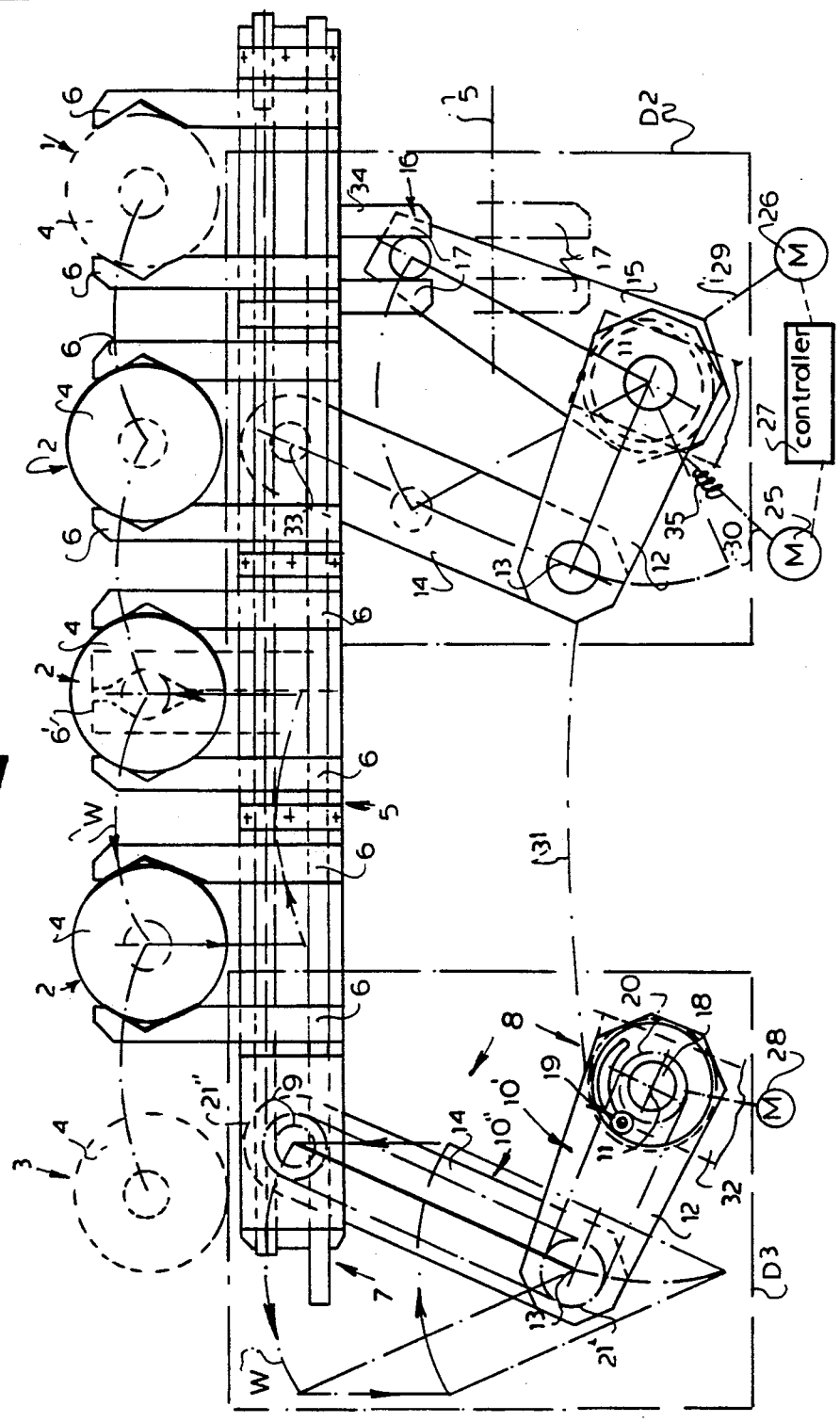
FIG. 1 is a partly schematic view of the transport system according to this invention.
Figure 2:
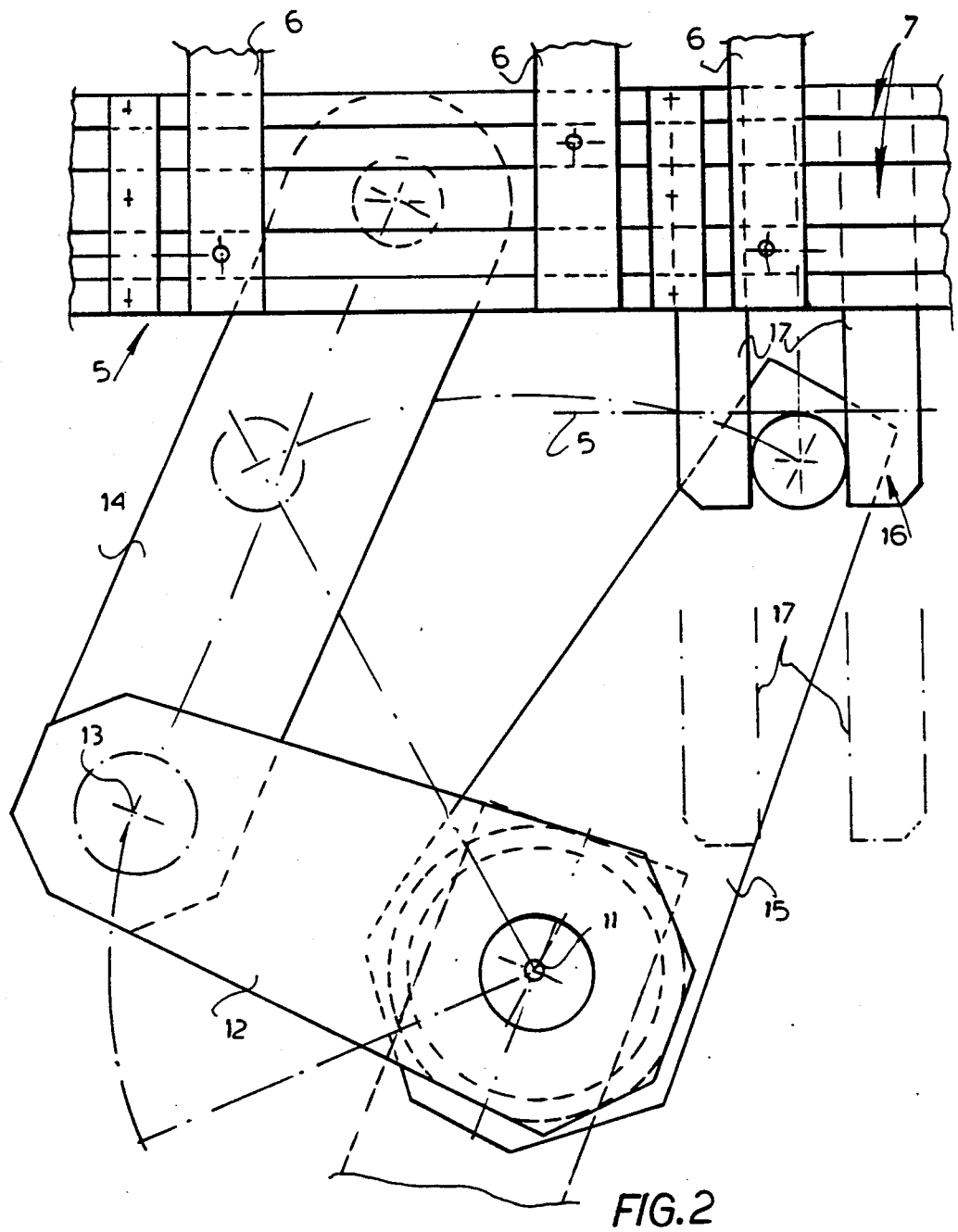
FIGS. 2 and 3 are large-scale views of the details indicated at D2 and D3, respectively, of FIG. 1.

As seen in FIG. 1 a treatment system comprised of a plurality of machining devices of which one is shown schematically at 24 has an input station 1, a plurality of machining or treatment stations 2, and an output station 3, all spaced apart equidistantly along a straight line. Identical workpieces 4 are stepped in a direction D through the stations 1 through 3 by a transport device having a rail 5 extending parallel to the direction D and provided with a plurality of pairs of jaws 6 spaced apart by the distance between adjacent stations and carried on respective rods 7 so that they can be opened or closed as shown in dashed lines for the center jaw pair 4. To this end the right-hand jaw as seen in FIG. 1 is affixed to the lower rod 7 and the left-hand jaw 6 of each pair to the upper rod 7 so that opposite sliding of the rods 7 of the rail 5 will open or close the jaws 6.

The transport rail 5 is supported on a pair of lever systems 8 each comprising a main lever 12 pivoted at a respective axis 11 on a housing 32 of the machine and having an outer end provided with a pivot 13. A fixed-length link 14 has an inner end pivoted at 13 on the outer end of the lever 12 and an outer end pivoted at 33 on the rail 5. The two lever systems 8 are identical, with the axes 11 and 13 all parallel. The pivots 13 are interconnected by a link shown schematically at 31 and a common actuator 25 is connected via another link shown schematically at 30 to one of the levers 12 or to the link 31 to jointly operate both of the levers 12 by oscillating them back and forth through a predetermined angle.

In addition at least one of the axes 11 carries a lever 15 having an outer end provided with an entrainment pin 16 received in a slot 17 formed by a pair of extensions 34 projecting perpendicular to the direction D from the rail 5. This pin 16 is therefore coupled for joint movement in the direction D with the rail 5 but can move independently thereof perpendicular to this direction D. Another motor 26 is connected via a link shown schematically at 29 to the lever 15 for operating it independently of the levers 12. A controller 27 is connected to both of the prime movers 25 and 26.

Figure 3:
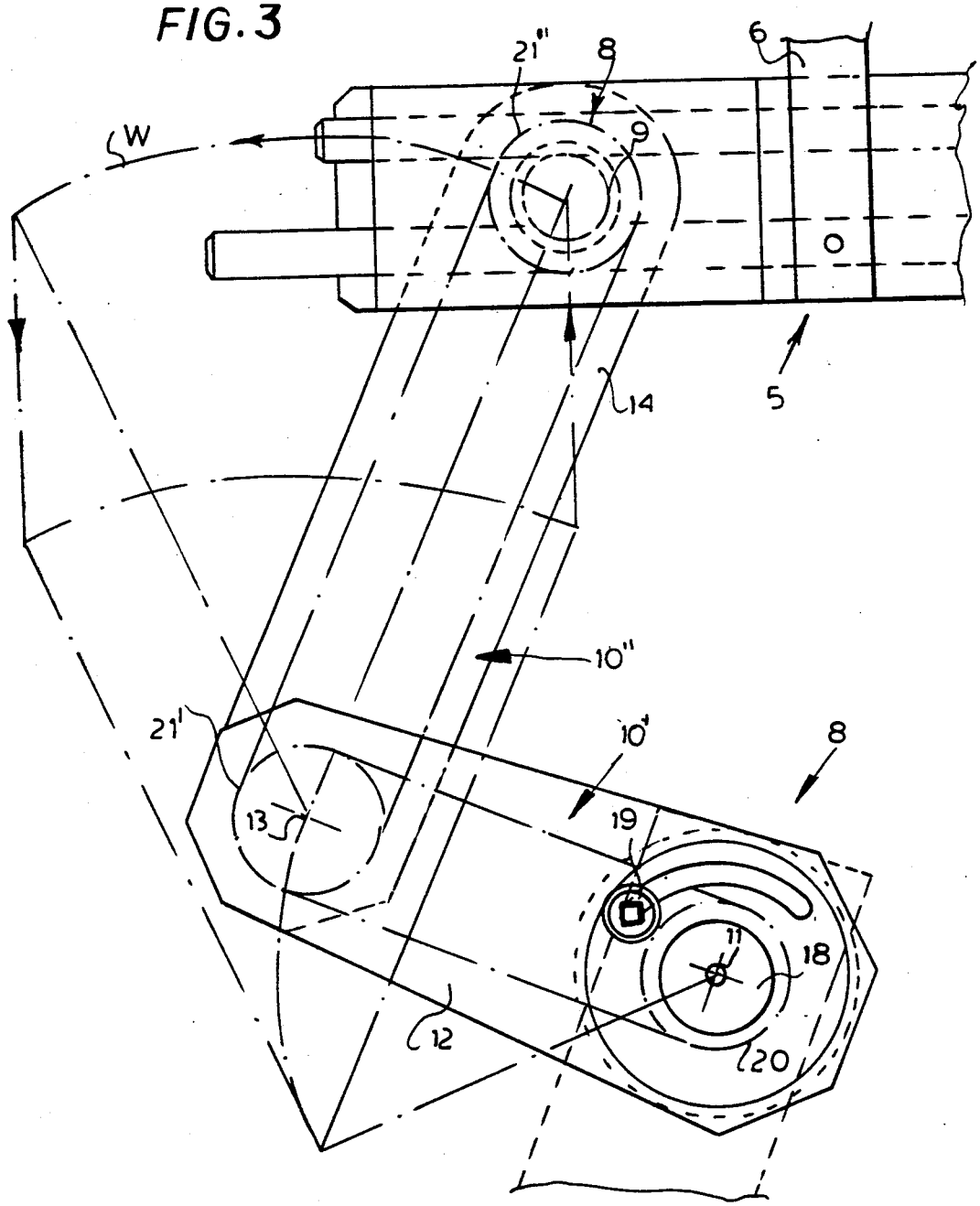

Mounted on the axis 11 of one of the levers 12, the left-hand lever of FIG. 1 (see also FIG. 3) is a pinion 20 over which is spanned an inner belt 10' having an outer end engaged around a pulley or gear wheel 21' carried on the axis 13. An outer belt 10'' is engaged over this wheel 21' and over another wheel 21'' carried on the rail 5 and carrying a pinion 9 meshing oppositely with confronting racks formed on the actuating rods 7. An adjustable range setting device 19 is provided for establishing the opening and closing points of the jaws 6. This device 19 is formed as a screw which can be loosened to allow the pinion 20 to be rotated to any of a multiplicity of angularly offset positions on the shaft 18 and tightened to lock it thereon in any of these positions. Thus the starting positions and ending positions of the jaws 6 can be set wide as shown in solid lines in the drawing or close as shown in dashed lines at 6' in FIG. 1.

Figure 4:
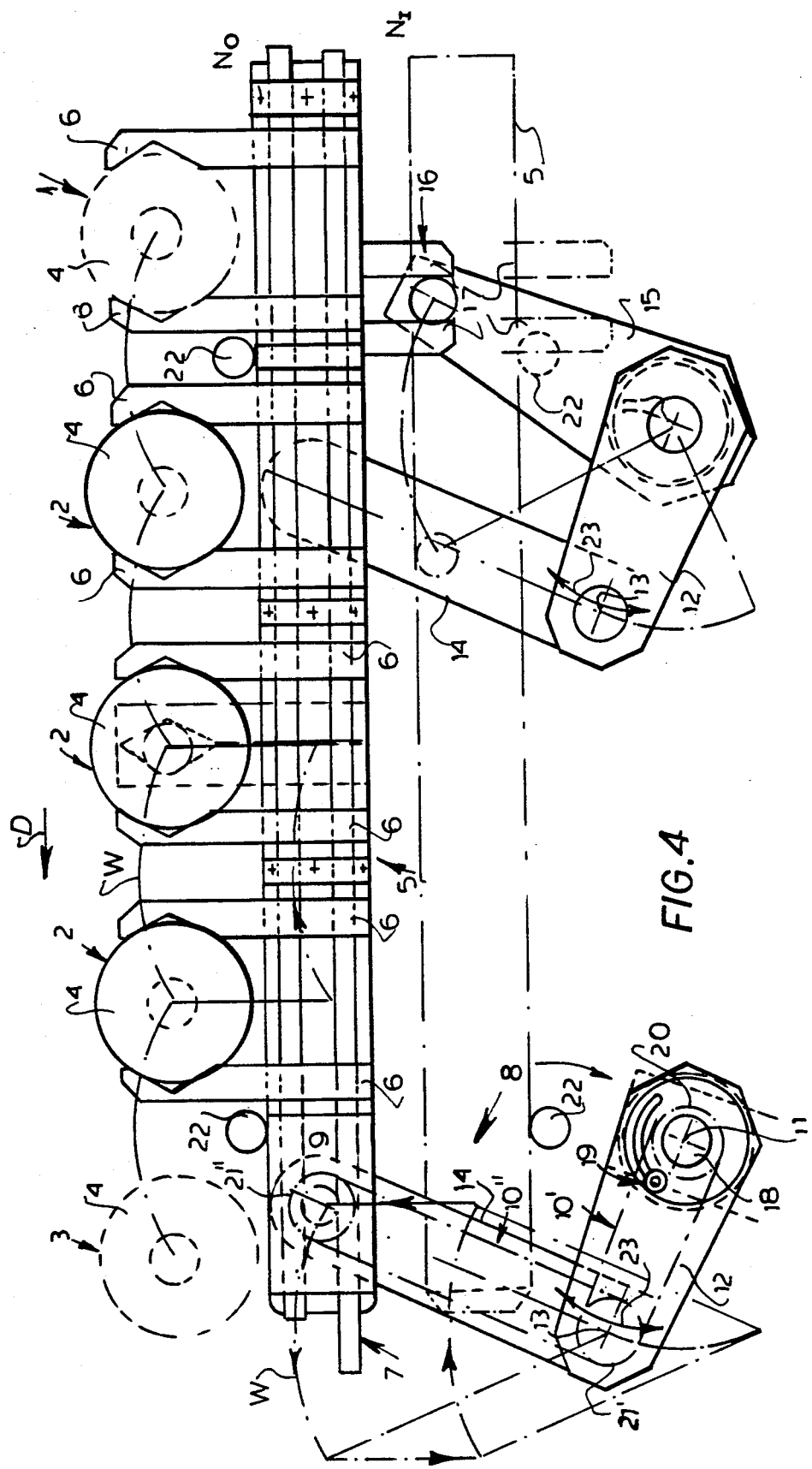
FIG. 4 is a view like FIG. 1 of a variant on the system of this invention.

It is possible as shown in FIG. 4 to provide inner and outer pairs of the abutment rollers 22 which limit the outward and inward travel of the rail 5.

Figure 5:
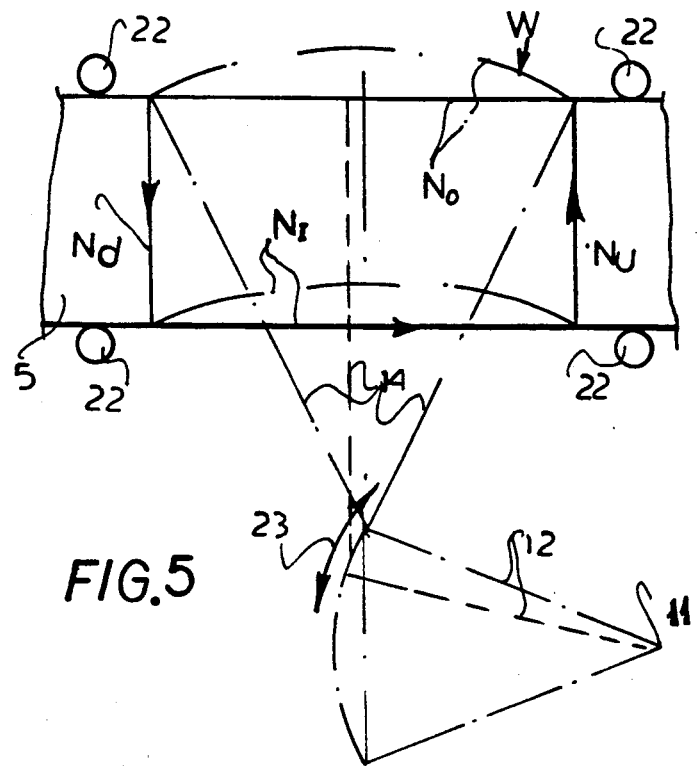
FIGS. 5 and 6 are diagrams illustrating operation of the system of this invention.
Figure 6:
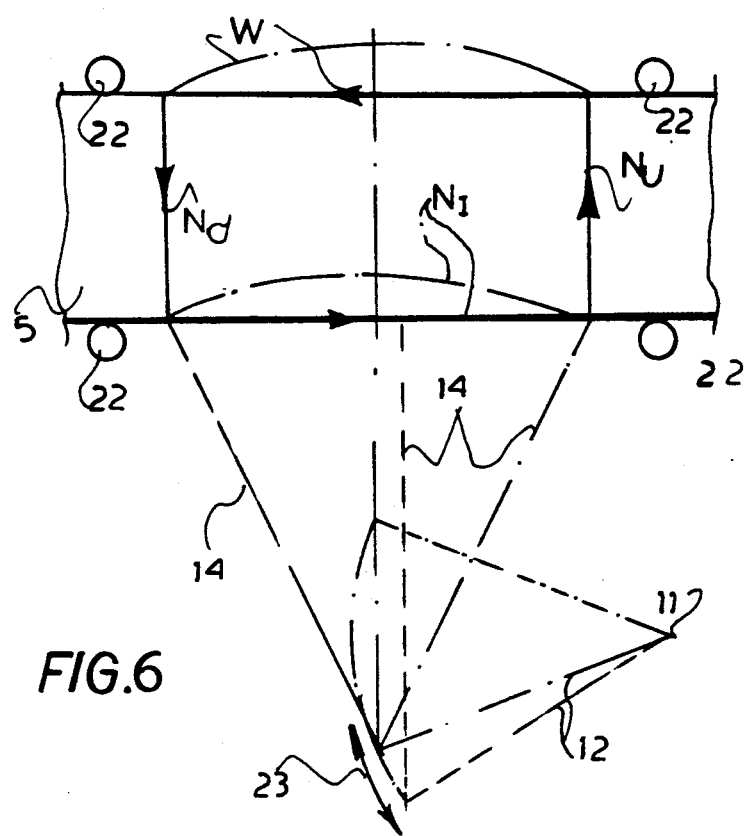

The rail 5 is moved as seen in FIGS. 5 and 6 by the above-described drive system such that a point on it moves along a path formed as a four-sided closed figure W having an outer leg $N_O$, and inner leg $N_I$ and upstream and downstream legs $N_U$ and $N_D$. When the abutments 22 are not provided the upper and lower legs $N_O$ and $N_I$ of the figure W as seen in the drawing, and which correspond to the travel in and against the direction D are arced. Travel perpendicular to the direction D along the legs $N_U$ and $N_I$ is always in a straight line.

More particularly during normal operation the motor 26 first moves the arm 15, one of which may be provided at each of the axes 11 if desired, counterclockwise to move the pin 16 through an arc from the solid-line position of FIG. 1 to the dot-dash line position. During this movement the levers 12 are stationary in the system with no abutments 22, but in the system with abutments 22 a lost-motion coupling, here a spring 35, in the link 30 allows for limited movement as indicated by arrows 23 in FIG. 4, 5, and 6. In both systems the links are oscillated through an arc during such pivoting of the lever 15, whether or not the respective levers 12 are moved. Thus without the abutments the rail 5 travels downstream in the direction D through an arc. When the abutments 22 are present it moves downstream as shown in solid lines in FIG. 5 and 6.

Once in the downstream position the lever 15 is arrested and the levers 12 are rotated clockwise through an arc as indicated in FIGS. 5 and 6 so as to pull the rail 5 inward perpendicular to the direction of D toward the stations 2, pulling the clamps 6, which previously have been opened, out of the stations 1-3. This motion is always in a straight line, with the pin 16 sliding in the slot 17.

Thereafter the lever 15 is reverse oscillated through its stroke, moving the clamps 6 back upstream against the direction of D, here in an arc as shown in dot-dash lines FIGS. 5 and 6 or in a straight line, depending whether or not the abutments rollers 22 are provided. Once in the upstream position the levers 12 are reverse rotated to move the clamps 6 back out into the stations 1 through 3, whereupon they are again closed by a motor 28 on the workpieces 2.

I claim:
1. In combination with a machining operation where a workpiece is moved stepwise in a transport direction through a succession of stations, a transport apparatus comprising:
   a stationary housing adjacent the stations;
   a rail extending in the direction adjacent the stations and movable both parallel and perpendicular to the direction;
   a plurality of clamps spaced apart in the direction on the rail and each displaceable between an open and a closed position, whereby a workpiece can be gripped by each of the clamps in the closed position thereof;
   a set of control rods forming racks and carried and displaceable on the rail and connected to the clamps and oppositely displaceable to move the clamps between their open and closed positions;
   a pinion meshing with the racks of the control rods;
   a pair of like lever systems each having an inner end pivoted on the housing and an outer end pivoted on the rail;
   transverse displacement means for synchronously pivoting the lever systems and thereby displacing the rail through a predetermined stroke perpendicular to the direction between inner and outer positions;
   longitudinal displacement means including a transverse guide and entrainment element carried at least partially on the rail for displacing the rail through a predetermined stroke parallel to the direction between upstream and downstream end positions; and
   clamp-closing means including a set of endless flexible drive elements extending along one of the lever systems and having an outer end connected to the pinion for displacing the clamps between their open and closed positions.

2. The transport apparatus defined in claim 1 wherein each lever system includes
   an inner lever having an inner end pivoted on the housing and an outer end, and
   an outer link having an inner end pivoted on the outer end of the respective inner lever and an outer end pivoted on the rail, the longitudinal displacement means including an arm pivoted on the housing with one of the inner levers and having a head transversely displaceable in the guide of the rail.

3. The transport apparatus defined in claim 1, further comprising:
an inner abutment engageable with the rail only in the inner position thereof; and
an outer abutment engageable with the rail only in the outer position thereof, the lever systems being provided with means for permitting limited pivoting of the lever systems during straight-line movement between the upstream and downstream end positions.

4. The transport apparatus defined in claim 3 wherein the means for permitting pivoting is a spring coupled to the lever systems.

5. The transport apparatus defined in claim 1 wherein the clamp closing means includes:
a shaft coaxial with the inner end of the one lever systems,
a second pinion carried on the shaft and connected to the inner end of the set of elements, and
means connecting the second pinion and the pinion meshing with the racks to the shaft in any of a plurality of angularly offset positions for setting the spread between the jaws in the open and closed positions.

* * * * *